R. F. CHATILLON.
SCALE.
APPLICATION FILED MAR. 24, 1916.

1,259,362.

Patented Mar. 12, 1918.
2 SHEETS—SHEET 1.

Inventor
Ralph F. Chatillon,
By his Attorneys
Edwards, Sager & Wooster

R. F. CHATILLON.
SCALE.
APPLICATION FILED MAR. 24, 1916.

1,259,362.

Patented Mar. 12, 1918.
2 SHEETS—SHEET 2.

Inventor
Ralph F. Chatillon,
By his Attorneys
Edwards, Sager & Wooster

UNITED STATES PATENT OFFICE.

RALPH F. CHATILLON, OF SCARSDALE, NEW YORK, ASSIGNOR TO JOHN CHATILLON & SONS, A CORPORATION OF NEW YORK.

SCALE.

1,259,362.  Specification of Letters Patent.  Patented Mar. 12, 1918.

Application filed March 24, 1916. Serial No. 86,334.

*To all whom it may concern:*

Be it known that I, RALPH F. CHATILLON, a citizen of the United States, residing at Scarsdale, in the county of Westchester and State of New York, have invented certain new and useful Improvements in Scales, of which the following is a full, clear, and exact specification.

This invention relates to scales of the type having the weighing platform above the indicating mechanism, and relates especially to scales known in the trade as bathroom scales. In such scales, a person stands on the platform and reads his weight by looking at the indicator from a distance, the indicator being close to the mechanism for the purpose of providing a small and compact scale.

The object of the present invention is to provide a scale which can be read without requiring the use of mirrors, or the mounting of the dial upon a tall column extending vertically at one side of the platform. In carrying out the invention, the scale dial is formed on the surface of a horizontal cylinder and moves relatively to a fixed pointer located above the cylinder so that the scale and pointer are visible through a window from above. The invention also includes a novel arrangement of the weighing mechanism, whereby compactness and cheapness of manufacture are secured.

In the accompanying drawings.

Figure 1:
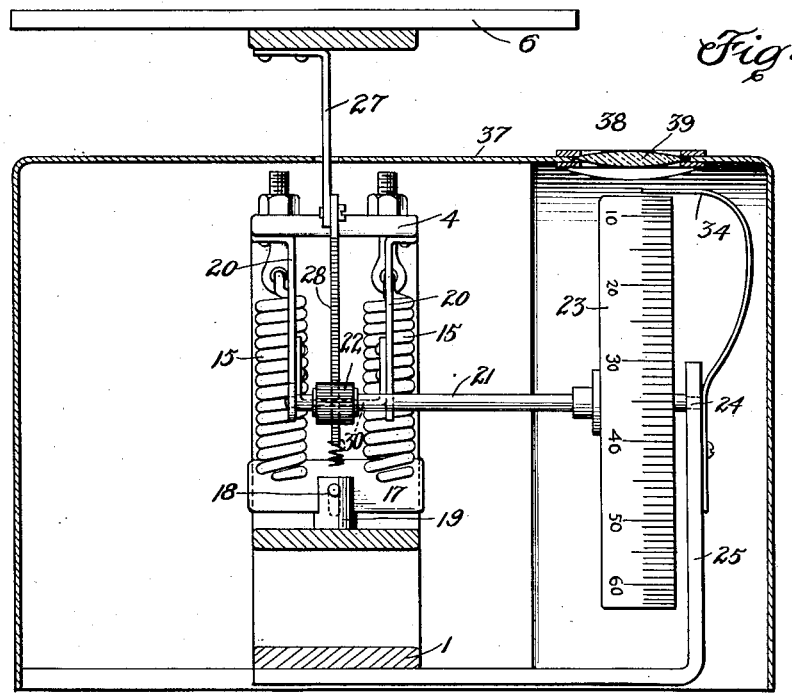
Figure 1 is a side elevation of a scale embodying the invention.
Figure 2:
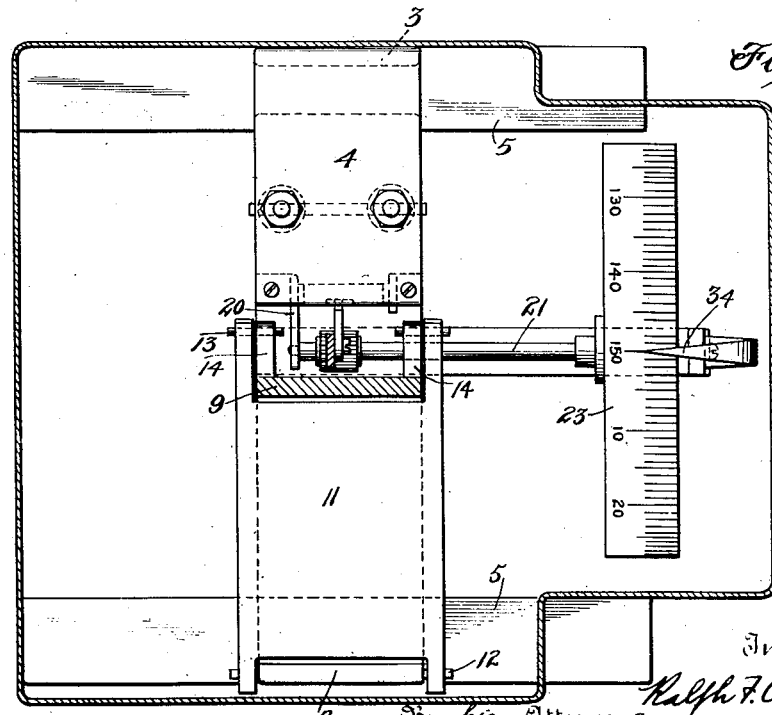
Fig. 2 is a plan view with the platform removed.
Figure 3:
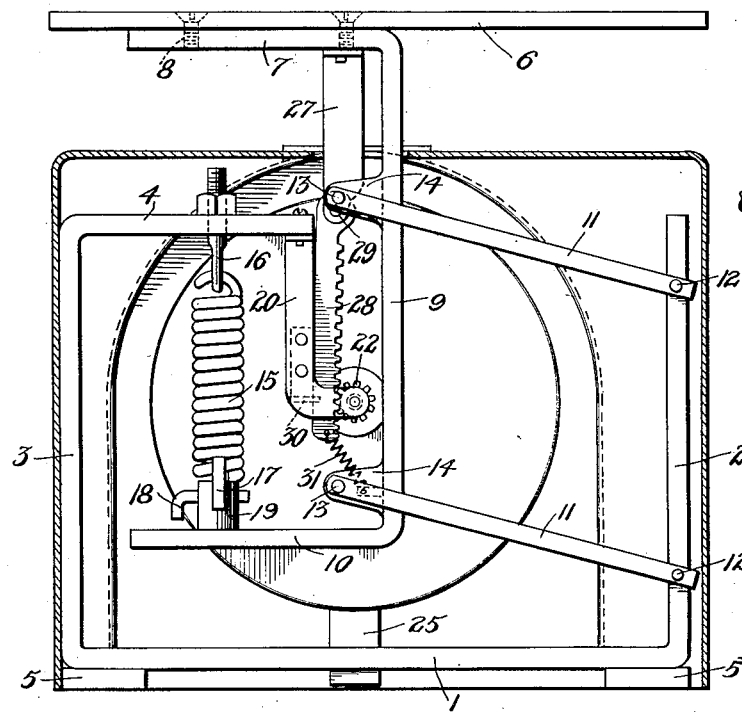
Fig. 3 is an elevation seen at right angles to Fig. 1.
Figure 4:
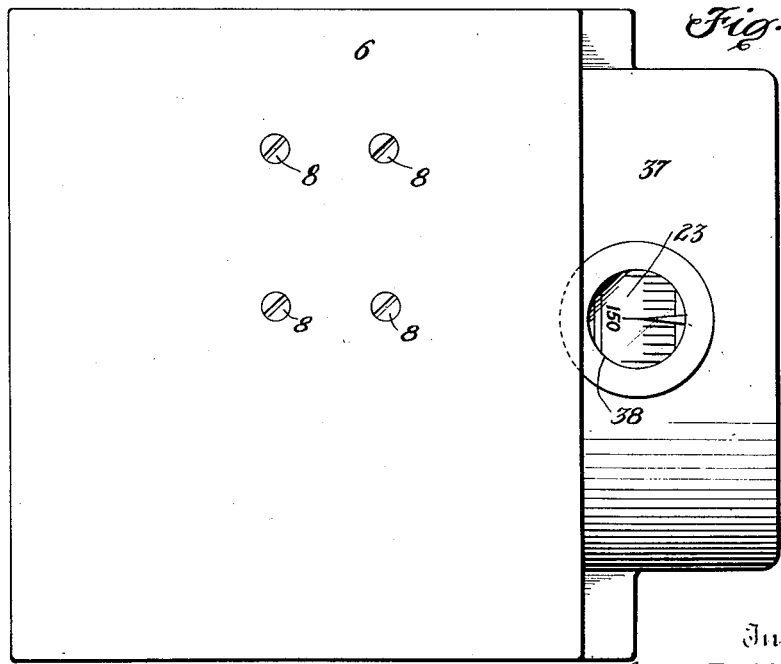
Fig. 4 is a plan view showing the platform in place.

The frame of the scale is composed of a rectangular strip of metal consisting of a base portion 1, sides 2, 3, and an upper portion 4. 5, 5, are transverse feet attached to the portion 1. 6 represents the platform which is secured to a channel shaped section 7 by screws 8. The channel 7 has a depending portion 9 and a lower horizontal portion 10. The vertical portion 9 carrying the platform is caused to swing vertically on parallel links 11 pivoted at 12 to the side member 2 and at 13 on ears 14 to the vertical bar 9. The pivots 13 are in the same plane as the pitch line of the rack and pinion, so that no lifting moment is produced on the rack when a weight is put at the outer edge of the platform. 15 are the weighing springs, which are attached by studs 16 at their upper ends to the bar 4 and at their lower ends by a yoke 17 pivoted at 18 to a stud 19 carried by the bar 10. The bar 4 carries two depending arms 20, 20, in which is journaled the dial shaft 21 carrying at one end pinion 22 and at its outer end the rotary cylindrical dial 23. The outer end of the shaft is journaled at 24 in a bracket 25 attached to the base member 1. The bar 7 which carries the platform carries a depending arm 27 to which is pivoted rack 28 which actuates the pinion 22, the rack being pivoted to the bar 27 at 29 and being guided by a bridge piece 30 carried by the arms 20. A spring 31 holds the rack 28 in engagement with the pinion 22.

34 is a fixed pointer mounted on the bracket 25 and extending horizontally over the scale on a rotary dial 23, the dial being positioned on the shaft 21 so that the zero point will come under the pointer 34 at no load. 37 is a casing which incloses the scale and the dial, and has an opening 38 through which the dial and pointer may be viewed from above, the window preferably being provided with a lens 39 so as to enlarge the divisions on the scale and enable them to be easily seen by a person standing on the platform 6.

The scale of this invention is much more compact, and is cheaper to construct, than previous scales of this type. By this invention, the use of swinging mirrors is avoided and also the use of a tall column to carry the dial and pointer. By means of the horizontally rotating dial combined with a fixed pointer, the indicating mechanism is much simpler and not liable to get out of order because of relatively few moving parts. Various modifications and changes may be made in the particular construction herein shown without departing from the scope of the appended claims.

Having thus described my invention, I declare that what I claim as new and desire to secure by Letters Patent, is:—

1. In a scale, a base having a horizontally extending arm, a weighing spring depending therefrom, a vertically extending platform carrying bar having a horizontally extending arm under said base arm and attached to the lower end of said spring, means for guiding the platform carrying bar vertically, a depending rack carried by said platform bar, a horizontally mounted rotary dial having actuating connection with said rack and having peripheral graduations, and a horizontally projecting pointer disposed adjacent the upper periphery of said dial.

2. In a scale, a base having a horizontally extending arm, a weighing spring depending therefrom, a vertically extending platform carrying bar having a horizontally extending arm under said base arm and attached to the lower end of said spring, parallel links for guiding the platform carrying bar vertically, a depending rack carried by said platform bar, a horizontally mounted rotary dial having actuating connection with said rack and having peripheral graduations, and a horizontally projecting pointer disposed adjacent the upper periphery of said dial.

3. In a scale, a base carrying separated uprights, a spring carrying arm extending laterally from one of said uprights, a plurality of springs depending from said arm, a vertical platform support having a horizontally extending bar connected to the lower ends of said springs, a platform on the upper end of said support, parallel horizontal links connected at one end to said platform support and at the other end to said other upright, a vertically disposed rack mounted to move with said platform support, a horizontally mounted rotary dial having actuating connection with said rack and peripheral graduations visible from above outside the edge of the platform, and a stationary zero indicator above said dial and adjacent said graduations.

In testimony whereof I affix my signature.

RALPH F. CHATILLON.